US009654149B2

(12) United States Patent
Piipponen et al.

(10) Patent No.: US 9,654,149 B2
(45) Date of Patent: May 16, 2017

(54) MULTIPLE RADIO INSTANCES USING SOFTWARE DEFINED RADIO

(75) Inventors: Antti-Veikko Sakari Piipponen, Tampere (FI); Kalle August Raiskila, Nukari (FI); Pasi Johannes Rinne-Rahkola, Helsinki (FI); Tommi Juhani Zetterman, Espoo (FI); Heikki Ilmari Berg, Viiala (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 774 days.

(21) Appl. No.: 12/810,865

(22) PCT Filed: Dec. 23, 2008

(86) PCT No.: PCT/IB2008/055522
§ 371 (c)(1),
(2), (4) Date: Jun. 28, 2010

(87) PCT Pub. No.: WO2009/083912
PCT Pub. Date: Jul. 9, 2009

(65) Prior Publication Data
US 2010/0291942 A1    Nov. 18, 2010

Related U.S. Application Data

(60) Provisional application No. 61/009,349, filed on Dec. 28, 2007.

(51) Int. Cl.
H04B 1/03 (2006.01)
H04B 1/00 (2006.01)

(52) U.S. Cl.
CPC ................................ H04B 1/0003 (2013.01)

(58) Field of Classification Search
USPC ...................................................... 455/552.1
See application file for complete search history.

(56) References Cited

U.S. PATENT DOCUMENTS 6,282,184 B1   8/2001 Lehman et al.
2003/0158954 A1   8/2003 Williams
(Continued)

FOREIGN PATENT DOCUMENTS

WO   2004/008719 A    1/2004
WO   2006/055784 A2   5/2006

OTHER PUBLICATIONS

Gizmodo Cellphones, "TechFaith Launches World's First WCDMA/GSM Dual Mode Phone", http://gizmodo.com/gadgets/cellphones/techfaith-launches-worlds-first-wcdmagsm-dual-mode-phone-318031.php, retrieved on Aug. 31, 2011, 3 pages.
(Continued)

Primary Examiner — Steven Kelley
(74) Attorney, Agent, or Firm — Squire Patton Boggs (US) LLP

(57) ABSTRACT

In a first aspect an exemplary embodiment of the invention provides a method that includes instantiating a plurality of radio protocols, operating the plurality of radio protocols with an underlying physical layer, where each instantiation of a same radio protocol is embodied in a same code module and where each instantiation has associated data stored in a memory. The operating of the plurality of radio protocols comprises executing each instantiation of the radio protocols so that a portion of resources are shared between different instantiations of the radio protocols and different instantiations of radio protocols do not interfere with each other.

17 Claims, 4 Drawing Sheets

(56) References Cited

U.S. PATENT DOCUMENTS

| | | | |
|---|---|---|---|
| 2005/0025170 A1* | 2/2005 | Po et al. | 370/431 |
| 2005/0079890 A1* | 4/2005 | Yu | 455/557 |
| 2005/0165916 A1 | 7/2005 | Cromer | |
| 2006/0015674 A1 | 1/2006 | Murotake | |
| 2006/0046716 A1 | 3/2006 | Hofstaedter | |
| 2006/0154691 A1* | 7/2006 | Tang et al. | 455/552.1 |
| 2006/0287001 A1* | 12/2006 | Budampati et al. | 455/552.1 |
| 2006/0291483 A1* | 12/2006 | Sela | 370/401 |
| 2007/0140161 A1* | 6/2007 | Silverman et al. | 370/329 |
| 2007/0206632 A1 | 9/2007 | Doo | |
| 2009/0141660 A1* | 6/2009 | Hassan et al. | 370/310 |
| 2011/0039503 A1* | 2/2011 | Hu et al. | 455/74 |

OTHER PUBLICATIONS

International Search Report and Written Opinion received in corresponding Patent Cooperation Treaty Application No. PCT/IB2008/055522, Jul. 20, 2009, 8 pages.

Notification of Second Office Action dated Dec. 17, 2012 corresponding to Chinese Patent Application No. 200880106572.0 and English translation thereof.

Chinese Office Action with English language translation dated Dec. 11, 2013, for corresponding Chinese Application No. 200880106572.0.

Office Action dated Jun. 6, 2014, issued in corresponding Chinese Application No. 200880106572.0.

Office Action issued in corresponding European Application No. 08867011.2, dated Oct. 20, 2016.

Office Action dated Jul. 9, 2013 in corresponding Chinese Application No. 200880106572.0.

\* cited by examiner

MULTIPLE RADIO INSTANCES USING SOFTWARE DEFINED RADIO

RELATED APPLICATIONS

This is application was originally filed as PCT Application No. PCT/IB2008/055522 on Dec. 23, 2008 and claims priority to U.S. Provisional Application No. 61/009,349 filed on Dec. 28, 2007, which is incorporated herein by reference in its entirety.

TECHNICAL FIELD

The exemplary and non-limiting embodiments of this invention relate generally to wireless communication systems, methods, devices and computer programs and, more specifically, relate to radio technology, multiradio scheduling and software defined radio (SDR).

BACKGROUND

The following abbreviations are utilized herein:

| | |
|---|---|
| 3G | third generation (cellular standard) |
| GSM | global system for mobile communications |
| HSDPA | high speed downlink packet access |
| MAC | medium access control |
| MRC | multiradio controller |
| RF | radio frequency |
| SDR | software defined radio |
| SIM | subscriber identity module |
| WLAN | wireless local area network (IEEE 802.11 family) |

Traditionally, a radio access protocol stack has been a single entity with a top-level control interface and dedicated hardware resources. Having two instances of the same radio system in the same device has not been feasible in a practical sense, as this would require that two instances of all of the hardware and software resources be present.

It is recognized that some radio standards allow quite efficient de-coupling of the physical layer (PHY) and the protocols part (layers above PHY, such as the MAC). This may be used to share the same physical layer implementation between variants of one radio standard, or even across multiple standards. GSM and 3G resource sharing is one example, wherein the radio systems may utilize many of the same hardware resources efficiently since their standardization is coordinated in the same standardization body. This only allows, however, utilizing different radio access technologies to obtain access to the wireless cellular network, one technology at a time.

SUMMARY

The foregoing and other problems are overcome, and other advantages are realized, by the use of the exemplary embodiments of this invention.

In a first aspect thereof the exemplary embodiments of this invention provide a method comprising: instantiating a plurality of radio protocols, and operating the plurality of radio protocols with an underlying physical layer, where each instantiation of a same radio protocol is embodied in a same code module and where each instantiation has associated data stored in a memory. Furthermore, the operating comprises executing each instantiation of the radio protocols so that a portion of resources are shared between different instantiations of the radio protocols and different instantiations of the radio protocols do not interfere with each other.

In another exemplary embodiment of the invention, there is a memory storing a program of computer readable instructions that when executed by a processor result in actions that comprise: instantiating a plurality of radio protocols, and operating the plurality of radio protocols with an underlying physical layer, where each instantiation of a same radio protocol is embodied in a same code module and where each instantiation has associated data stored in a memory. The operating of the plurality of radio protocols comprises executing each instantiation of the radio protocols so that a portion of resources are shared between different instantiations of the radio protocols where different instantiations radio protocols do not interfere with each other.

In yet another exemplary embodiment of the invention, an apparatus comprises a memory; a hardware unit embodying a physical layer, and a controller configured to instantiate a plurality of radio protocols and to operate the plurality of radio protocols with the hardware unit, where each instantiation of a same radio protocol is embodied in a same code module and with associated data stored in the memory. Moreover, the controller is further configured to execute each instantiation of a radio protocol so that a portion of resources are shared between different instantiations of the radio protocols, and different instantiations of the radio protocols do not interfere with each other.

DETAILED DESCRIPTION

Figure 1:
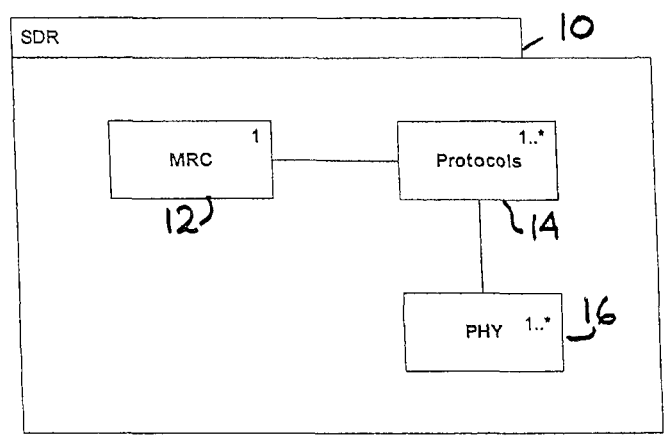
FIG. 1 is a class diagram of an SDR system showing those portions of most relevance to the exemplary embodiments of this invention.

As used herein SDR is assumed to encompass a radio computer that is capable of running concurrent radio systems on top of shared hardware resources. This differs from a "traditional" software controlled radio which typically use dedicated hardware resources, rather than shared resources, or where the resource sharing is very limited and subject to the applicable (and similar) radio standards (e.g. GSM/3G sharing the same RF signal path).

In the SDR in accordance with exemplary embodiments of this invention radio systems may be realized using software components running on one processor, or more than one different types of processors (e.g., general purpose, signal processing, vector processing), in addition to suitable hardware components to accommodate those functions that cannot be implemented (or are too inefficient to implement) with software. In this type of system it is possible to instantiate a single radio system two or more times. The two (or more) instances of the same radio system may utilize the same hardware resources (processing power and hardware components); and a MRC grants air access time (e.g., wireless cellular access) to the plurality of instances.

The utility of the exemplary embodiments of this invention may be described at least in part via the following, exemplary use cases.

Use Case A: A cellular phone participates in multiple wireless networks at the same time. This type of operation may imply that the phone user has two SIM cards, or a dual SIM (e.g., work and private subscriptions), and that the phone is simultaneously connected using both subscriber connections. From the wireless network perspective this appears as two separate and distinct user equipment. The cellular radios typically have a low duty cycle when in the idle mode and as a result wireless access is virtually guaranteed for each connection until there is activity, e.g., a phone call. When one connection is active, the other connection(s) are either dropped from the network, or an intelligent schedule is provided so that they can occasionally receive a few (idle state) messages from the base station.

This use case assumes that the separate protocol instances may share some hardware accelerators or other signal processing blocks in a time-sliced manner (scheduling provided, for example, using the MRC), which is described in greater detail below. In an exemplary implementation the dedicated (shared) components reside mainly at the RF front end. If one GSM subscriber connection is moved to the GSM 1800 MHz band, and the other operates on the GSM 900 MHz band, the protocol instances may cooperate more freely and the connection to the base station maybe kept alive during a phone call. The separate radio instance in this case is truly separate, and any co-existence operational approach may be handled at the phone's user interface level.

Use Case B: This use case involves a dual WLAN for routing between two WLAN networks. A (mobile) station is able to participate in two networks using time sharing; a concrete use case is participating both to an infrastructure network and an ad-hoc network simultaneously. This type of behavior may be applicable to other radio technologies as well.

Use Case C: This use case involves support for non-standard measurements/activities. Assume that although a radio system is activated and operating according to a standard, it may not be able to provide the radio user with "cognitivity" information. For example, a cellular radio may not be dictated by the applicable standard to scan for other networks (other than the current operator's network). This can be overcome by instantiating another cellular radio, and thereby freely scanning for another network or networks using the newly instantiated cellular radio. This assumes that the scanning can be scheduled at those times not used by the first radio instance.

Use Case D: This use case provides support for multiple types of radio "users", e.g., an administrator user, a field test user, a factory test user, an end user and a SIM-locked end user. As the entire radio instance may be duplicated for each user type, it is possible to give different types of access rights to the radio system parameters and usage. This enhances security measures of the phone.

Use Case E: This use case is concerned with balancing processor load in a multiprocessor environment. If one assumes that the underlying hardware resources provide too high a data rate for one radio protocol stack to handle (e.g., future implementations of so-called "giga-bit radio"), a solution is to duplicate the protocols and run them on separate processors, and then time-share the hardware resources. In this case the application's data stream is divided between these multiple radio system instances, and at some point is recombined into a single effective stream.

The implementation of the multiradio system to accommodate these and other use cases is straightforward in the SDR context in accordance with the exemplary embodiments of this invention.

First, an explanation is provided of how the radio stacks are implemented in the SDR system, followed by an explanation of the use of the exemplary embodiments of this invention.

RF signal chains may be designed for substantial reconfiguration so that hardware elements may support a plurality of radio standards. However, there are also RF elements that do not readily support multiple configurations. Typical examples of such components include RF front-end filters and power amplifiers. However, with a suitable software abstraction layer in their control interface, the details of different configurations can be hidden from the higher-layer protocols, so that any supported radio protocol can connect to the RF resources and use them. The same kind of arrangement is possible with the digital baseband function. Together, the RF and baseband functions are assumed to comprise the physical (PHY) layer.

FIG. 1 illustrates an exemplary class diagram of radio access stacks and a MRC in the SDR context, where the MRC schedules the access of the radio protocol to the physical resources (PHY layer hardware and radio spectrum). More specifically, FIG. 1 shows an embodiment of a SDR system 10 and an arrangement of a MRC 12, radio Protocols 14 and the PHY 16, and further shows the de-coupling of the radio Protocols 14 from the PHY 16. UML (Unified Modeling Language) notation may be used (as shown in FIG. 1, as well as in FIGS. 2-5). There may be multiple radio Protocols 14 that can be instantiated (i.e., activated), and multiple PHY 16 resource elements that support one or more radio standards. The MRC 12 basically schedules spectral resources. Due to the nature of RF, these are implicitly scheduled with the spectral access. The baseband (even if part of the PHY 16), need not necessarily be scheduled by the MRC 12 (in contrast to conventional MRC operation.)

Figure 2:
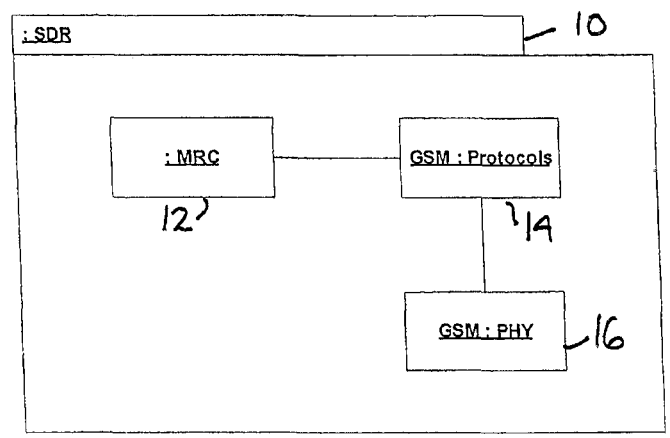
FIG. 2 is an object diagram of the SDR with a GSM system instantiated.

FIG. 2 shows the SDR system 10 at a time when a GSM radio stack is instantiated, i.e., activated and ready for use (the radio Protocols 14 implement GSM protocols). There is a single PHY 16 part for the GSM operation, and a single radio Protocols 14 part to contain the behavior and parameters of the GSM stack. The MRC 12 is also instantiated, although in the given case of the single GSM radio stack its functionality is not particularly relevant.

Figure 3:
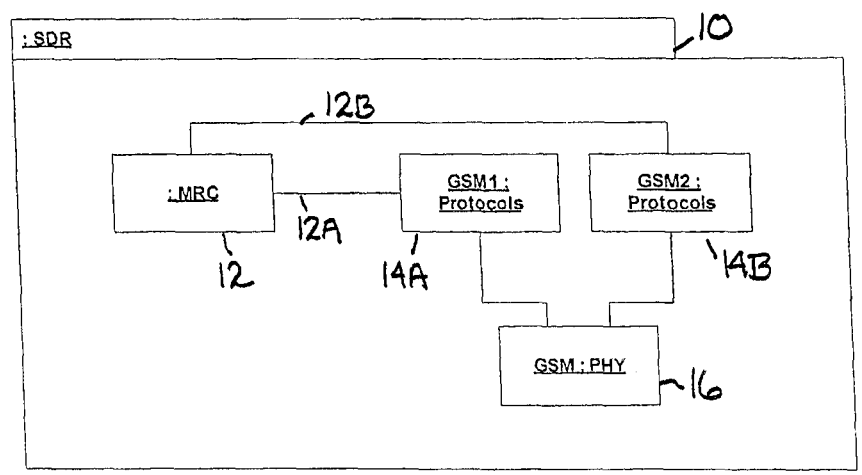
FIG. 3 is an object diagram of the SDR with two instances of the GSM system.

An implementation of one of the exemplary use cases (Use Case A) is illustrated in FIG. 3 in accordance with the exemplary embodiments of this invention. In this example two GSM Protocol stacks 14A and 14B are instantiated. It is assumed that there are no additional Physical resources 16 for the second GSM Protocol stack 14B, and both an original GSM Protocol stack 14A and a new (newly instantiated) GSM Protocol stack 14B share the same PHY resources 16. In this case one function of the MRC 12 is to regulate accesses to the PHY resources 16, via MRC control paths 12A, 12B, by the GSM Protocol stack 14A and the GSM Protocol stack 14B, respectively.

In general, the Protocol stack 14 may be implemented as computer executable software. As such, and in accordance with an aspect of this invention, it is possible to duplicate the executable software and run it on two or more processors (or processor cores (execution units)), or on one processor if the processor has sufficient processing power.

Figure 4:
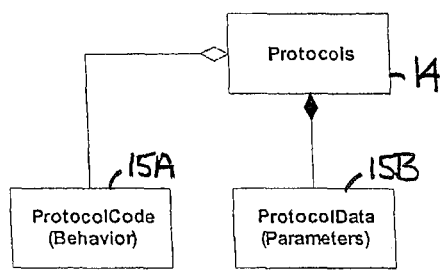
FIG. 4 is a class diagram of the contents of a radio protocol stack.
Figure 5:
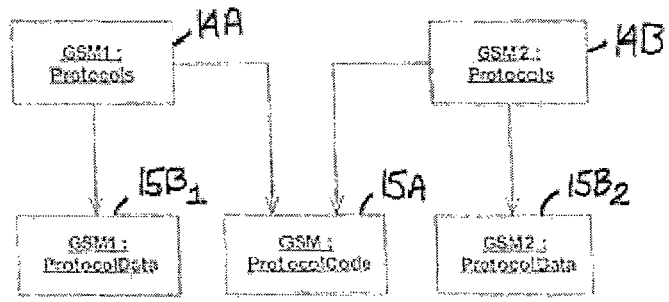
FIG. 5 is an object diagram showing instances of protocol stack elements when two GSM systems are instantiated.

It may be preferred that the software that implements the Protocol stacks 14 is designed to be re-entrant (or thread safe). While this may present an approach that is currently deemed optimal, the implementation of the exemplary embodiments of this invention does not require the use of re-entrant code, and other approaches may be attempted by those having skill in the art. By the use of re-entrant code it becomes possible to share program code between the multiple instances of the Protocol stacks 14. In fact, with re-entrant code there is only a need to duplicate the data area of the Protocol stack 14 when multiple instances are created so that each instance of the program code has an associated data area. Further, the behavioral part (program code) need be present in program memory but once. This principle is illustrated in FIG. 4 and FIG. 5. This technique decreases the memory requirements somewhat, as the executable code portion of the multiple radio protocol instances need be present but once in the memory.

More specifically, FIG. 4 depicts a class diagram showing the division of a Protocol stack 14 into a behavioral part 15A (program code) and a data part 15B (e.g., typically radio parameters). Upon a certain Protocol class being instantiated (the program code 15A) it is assumed to automatically contain its associated data (data part 15B). Thus, separate instances of Protocol stacks 14 may each have associated and separate data area. The Protocol code 15A is, however, instantiated only once for each radio system.

FIG. 5 is an exemplary object diagram showing the protocols-related instances of classes in the SDR system, at one time, for the example of FIG. 3. In this case both the original GSM Protocol stack 14A and the new GSM Protocol stack 14B operate from the same GSM Protocol Code 15A (which is assumed to be re-entrant and thread-safe), and each of the original GSM Protocol stack 14A and the new GSM Protocol stack 14B has an associated and separate Protocol data part $15B_1$ and $15B_2$, respectively.

Figure 6:
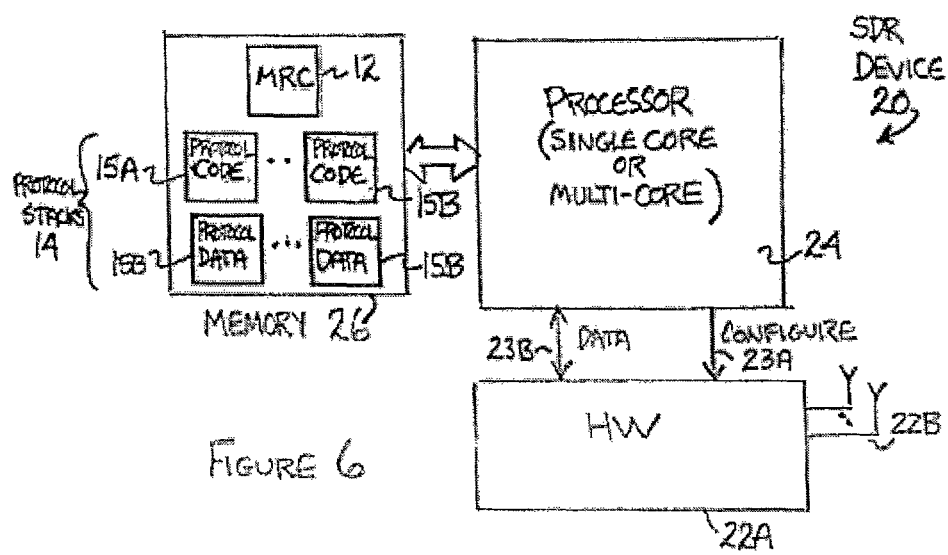
FIG. 6 depicts an exemplary embodiment of a SDR device, such as a multimode cellular phone or other type of communication device, that is suitable for practicing the exemplary embodiments of this invention.

FIG. 6 depicts an exemplary embodiment of a SDR device 20, such as a multimode cellular phone or other type of communication device. A hardware (HW) block 22A includes RF and other circuitry for supporting reception and transmission of wireless communication signals via one or more antennas 22B. In certain embodiments the HW block 22A may contain only that circuitry that is not efficiently implemented or emulated by program code running on a processor 24. In other embodiments all of the necessary RF front end and other circuitry (e.g., at least certain baseband circuitry) that is needed may be physically present in the HW block 22A. The HW block 22A is interfaced with the processor 24 using at least a configuration bus 23A, whereby the processor 24 is enabled to configure, program and select certain RF and other circuitry for use, as well as using a data bus 23B where the data (information) to be transmitted and that is received passes.

The processor 24 may be a single core or a multi-core processor that is coupled with a memory 26. In a single core processor 24 embodiment there may be a scheduler present for scheduling the execution of code, such as when time-slicing the processor execution of a plurality of software modules stored in the memory 26. In a multi-core embodiment each processor core may be capable of the simultaneous execution of a separate software module, and/or capable of simultaneously processing the same software module, depending on need. The software modules of most interest to this invention are a software module that implements the MRC 12 functionality, and software modules that implement the radio Protocol stack or stacks 14. In this case there may be multiple instances of different radio Protocol stacks 14 (e.g., a GSM stack and an E-UTRAN (evolved universal terrestrial radio access network, also referred to as LTE (long term evolution)) stack, or a GSM stack and a WLAN stack), or multiple instances of the same type of radio Protocol stack (as a non-limiting example, multiple instances of the GSM Protocol stack as shown in FIGS. 3 and 5, or multiple instances of an E-UTRAN Protocol stack, or multiple instances of an HSDPA Protocol stack, as non-limiting examples). In the latter case the memory 26 may contain only one instance of the Protocol code 15A, and multiple instances of the Protocol data 15B, as was shown in FIG. 5.

The MRC 12 is assumed to be capable of overall control and management of the operation of the processor 24 as it pertains to the radio Protocol stack(s) 14, and to be capable of instantiating additional instances of the same, or different, radio Protocol stacks 14 as needed (e.g., to satisfy the various use cases discussed above, as well as others).

Note that the embodiment shown in FIG. 6 is not intended to be limiting in any manner. For example, in a multi-core processor 24 embodiment (multi-execution unit processor) each processor core may have its own associated program and data memory, and may or may not also interface to a common memory. Further, the memory 26 may not be a separate block per se, but may be integrated with the processor block 24 (as may also some or all of the HW 22A) into a single integrated circuit or module. Further, it should be appreciated that the memory block 26 may also include the memory disposed on one (or more than one) removable SIM, or in a one SIM storing multiple user identities or subscriptions, as non-limiting examples.

Further, it should be noted that in some embodiments of this invention it may be desirable to implement the SDR 10 as an array of digital signal processors, custom logic blocks and/or vector processors. In general, a vector processor may be considered to be a computer that can perform an operation on an array of numbers in a single step, and may also be referred to as an array processor. Vector processors may be a preferred hardware embodiment for SDR baseband signal processing implementations. By the use of an array of vector processors a new set of algorithms can be loaded to support a new/different radio system. The multiple instances of a radio protocol that share the processing time of a vector processor, or a digital signal processor, would do so in a manner similar as to how they would share a custom logic block. In the exemplary embodiments of this invention any needed signal processing may be done in the HW 22A using any suitable type or types of components including logic blocks, digital signal processors and/or vector processors, as non-limiting examples.

As can be appreciated, creating multiple instances of radio systems allows for many significant and useful embodiments to be realized, while not increasing the complexity of the SDR system and device 20.

The exemplary embodiments of this invention provide the SDR radio device 20 with multiple instances of a single radio Protocol stack 14 that are enabled to use the same RF resources (HW 22A). The behavior of the various protocol stacks are "summed" at a connector of the antenna or antennas 22B.

The exemplary embodiments of this invention may be used to advantage in a multiple SIM user terminal having two or more subscriber connections active (at least participating to the network, and waiting for an incoming call or message) at the same time. The exemplary embodiments are also useful when implementing cognitive radio applications and devices.

The exemplary embodiments of this invention provide an ability to instantiate multiple instances of the same radio (radio Protocol 14) and thereafter divide, if desired, the traffic between the multiple instantiations, or to use each instantiation separately.

The exemplary embodiments of this invention further provide an apparatus comprising: a memory; a hardware unit embodying a physical layer; and a controller configured to instantiate a plurality of the radio protocols and to operate the plurality of radio protocols with the hardware unit, where each instantiation of a same radio protocol is embodied in a same code module and with associated data stored in the memory. The controller is further configured to execute each instantiation of a radio protocol so that a portion of resources are shared between different instantiations of radio protocols, and different instantiations of radio protocols do not interfere with each other.

Figure 7:
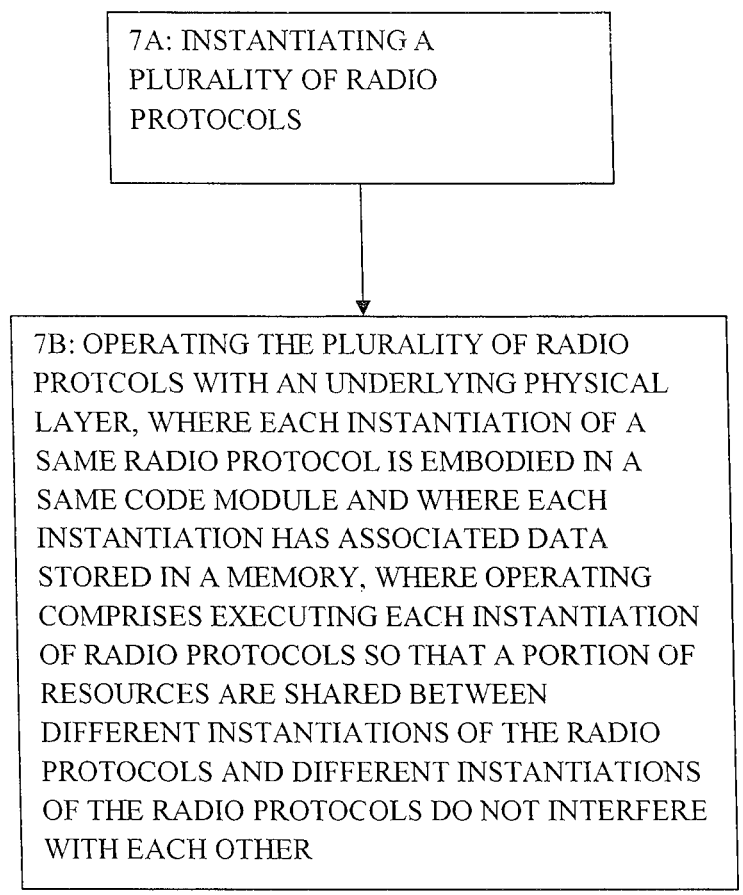
FIG. 7 depicts a logic flow diagram that illustrates the operation of a method, and the execution of computer program code, in accordance with the exemplary embodiments of this invention.

Based on the foregoing it should be apparent that the exemplary embodiments of this invention provide a method, apparatus and computer program to enhance the operation of a software defined radio that include a multiradio controller. Referring to FIG. 7, at Block 7A there is performed a step of instantiating a plurality of radio Protocols, and at Block 7B operating the plurality of radio Protocols with an underlying physical layer where each instantiation of the same radio protocol is embodied in the same code module and each instantiation has associated data stored in a memory. At Block 7B, the operating of the plurality of radio Protocols comprises executing each instantiation of the radio protocols so that a portion of resources are shared between different instantiations of the radio protocols and different instantiations of radio protocols do not interfere with each other.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the GSM, HSDPA and E-UTRAN (UTRAN-LTE) systems, it should be appreciated that the exemplary embodiments of this invention are not limited for use with only these particular types of wireless communication system, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
   instantiating a plurality of radio protocols via a multiradio controller, and
   operating the plurality of radio protocols with an underlying physical layer, where each instantiation of a same radio protocol is embodied in a same code module and where each instantiation has associated data stored in a memory, where the operating comprises simultaneously executing each instantiation of the same radio protocol so that a portion of resources are shared between different instantiations of the plurality of radio protocols and different instantiations of the plurality of radio protocols do not interfere with each other, where each instantiation is executed so as to divide communication traffic among the instantiations and then to recombine the divided communication traffic into a single effective stream of communication traffic,
   wherein the each instantiation of the same radio protocol includes instantiation of one of a plurality of activated and ready for use radio protocols, and
   wherein the simultaneously executing comprises executing the first instantiation and the second instantiation on respective simultaneous active connections.

2. A method according to claim 1, where each instantiation comprises a plurality of instances of a same radio protocol.

3. A method according to claim 1, where the different instantiations comprise a plurality of instances of different radio protocols.

4. A method according to claim 1, where each instantiation is executed in a time sliced manner by at least one data processor core.

5. A method according to claim 1, where each instantiation is executed by at least one vector processor.

6. A method according to claim 1, where each instantiation is executed by at least one digital signal processor.

7. A method according to claim 1, where each instantiation is executed to handle a single stream of communication traffic.

8. A method according to claim 1, executed in a multiple subscriber identity module wireless communication device.

9. A memory storing a program of computer readable instructions that when executed by a processor result in actions that comprise:

instantiating a plurality of radio protocols via a multiradio controller, and operating the plurality of multiple radio protocols with an underlying physical layer, where each instantiation of a same radio protocol is embodied in a same code module, and where each instantiation has associated data stored in a memory, where the operating comprises simultaneously executing each instantiation of the same radio protocol so that a portion of resources are shared between different instantiations of the plurality of radio protocols and different instantiations of the plurality of radio protocols do not interfere with each other, where each instantiation is executed so as to divide communication traffic among the instantiations and then recombine the divided communication traffic into a single effective stream of communication traffic, wherein the each instantiation of the same radio protocol includes instantiation of one of a plurality of activated and ready for use radio protocols, and wherein the simultaneously executing comprises executing the first instantiation and the second instantiation on respective simultaneous active connections.

10. An apparatus, comprising:

a memory;

a hardware unit embodying a physical layer; and a multiradio controller configured to instantiate a plurality of the radio protocols and to simultaneously operate the plurality of radio protocols with the hardware unit, where each instantiation of a same radio protocol is embodied in a same code module and with associated data stored in the memory, said multiradio controller further configured to execute each instantiation of the same radio protocol so that a portion of resources are shared between different instantiations of the plurality of radio protocols, and different instantiations of the plurality radio protocols do not interfere with each other, said multiradio controller further configured to execute each instantiation by dividing communication traffic among the instantiations and to recombine the divided communication traffic into a single effective stream of communication traffic, wherein the each instantiation of the same radio protocol includes instantiation of one of a plurality of activated and ready for use radio protocols, and wherein the simultaneously operating comprises executing the first instantiation and the second instantiation on respective simultaneous active connections.

11. The apparatus according to claim 10, further configured to execute each instantiation with a plurality of instances of a same radio protocol.

12. The apparatus according to claim 10, further configured to execute the different instantiations with a plurality of instances of different radio protocols.

13. The apparatus according claim 10, wherein the controller is configured to execute each instantiation of the radio protocols in a time sliced manner by using at least one data processor core.

14. The apparatus according to claim 10, wherein the controller is further configured to execute each instantiation using at least one vector processor.

15. The apparatus according to claim 10, wherein the controller is further configured to execute each instantiation by using at least one digital signal processor.

16. The apparatus according to claim 10, further configured to execute each instantiation with a single stream of communication traffic.

17. The apparatus according claim 10, embodied in a multiple subscriber identity module wireless communication device.

* * * * *